United States Patent
Wang et al.

[19]

[11] Patent Number: 6,062,512
[45] Date of Patent: May 16, 2000

[54] WOBBLE AND NUTATION CONTROL, AND SPIN STABILIZATION FOR A SPACECRAFT USING MOMENTUM CONSERVING DEVICES

[75] Inventors: Qinghong W. Wang, Torrance; Michael F. Barsky, Hermosa Beach, both of Calif.

[73] Assignee: Hughes Electronics Corporation, Los Angeles, Calif.

[21] Appl. No.: 08/921,752

[22] Filed: Aug. 27, 1997

[51] Int. Cl.[7] .................................................. B64G 1/38
[52] U.S. Cl. ........................................ 244/170; 244/165
[58] Field of Search .................................. 244/170, 165, 244/164, 171, 158 R

[56] References Cited

U.S. PATENT DOCUMENTS

| | | | |
|---|---|---|---|
| 3,591,108 | 7/1971 | Perkel et al. ................................. | 244/1 |
| 4,193,570 | 3/1980 | Hoffman et al. ......................... | 244/165 |
| 4,230,294 | 10/1980 | Pistiner .................................... | 244/170 |
| 5,012,992 | 5/1991 | Salvatore ................................ | 244/3.23 |
| 5,794,892 | 8/1998 | Salvatore ................................ | 244/165 |
| 5,816,538 | 10/1998 | Challoner et al. ....................... | 244/170 |
| 5,826,829 | 10/1998 | Holmes .................................... | 244/165 |

FOREIGN PATENT DOCUMENTS 0739818  10/1996  European Pat. Off. .

OTHER PUBLICATIONS

John E. White and Rush D. Robinnet III, Sandia National Laboratories, Albuquerque, New Mexico, Title: "Principal Axis Misalignment Control for Deconing of Spinning Spacecraft", vol. 17, No. 4, Jul.–Aug. 1994, Journal of Guidance, Control and Dynamics, pp. 823 to 830.

*Primary Examiner*—J. Woodrow Eldred
*Attorney, Agent, or Firm*—Terje Gudmestad; Georgann Grunebach; Michael W. Sales

[57] ABSTRACT

A method of damping nutation and removing wobble of a spacecraft provided with first and second momentum sources having linearly independent momentum components in the plane transverse to the given axis. The method includes sensing angular velocities of the spacecraft along orthogonal first and second axes in the transverse plane, and generating velocity signals representative of the angular velocities. The velocity signals are processed to form control signals representative of desired torques for driving the momentum sources. The desired torques have a first additive component proportional to the angular velocities for removing the wobble and a second additive component proportional to the first derivatives of the angular velocities for damping the nutation.

8 Claims, 6 Drawing Sheets

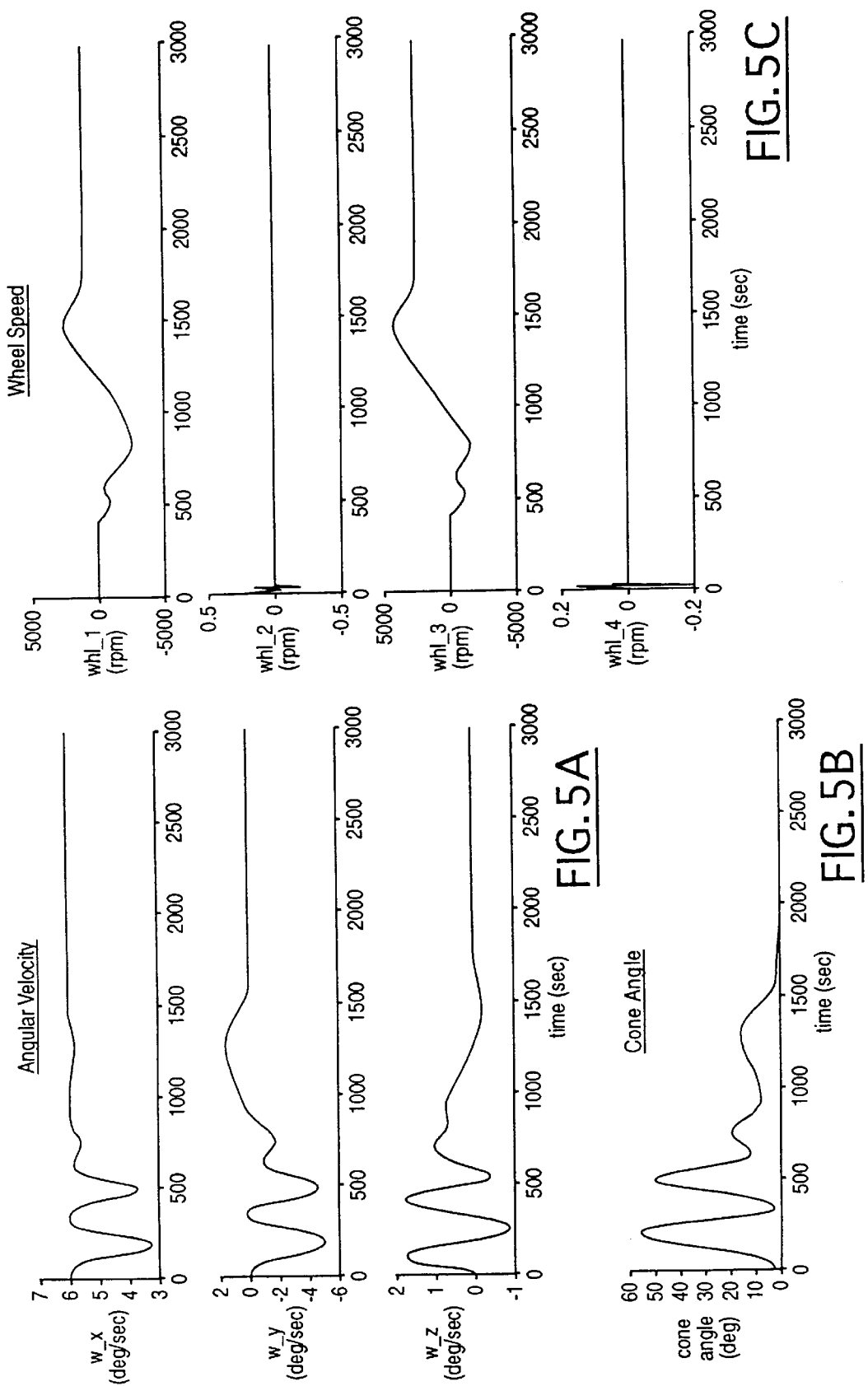

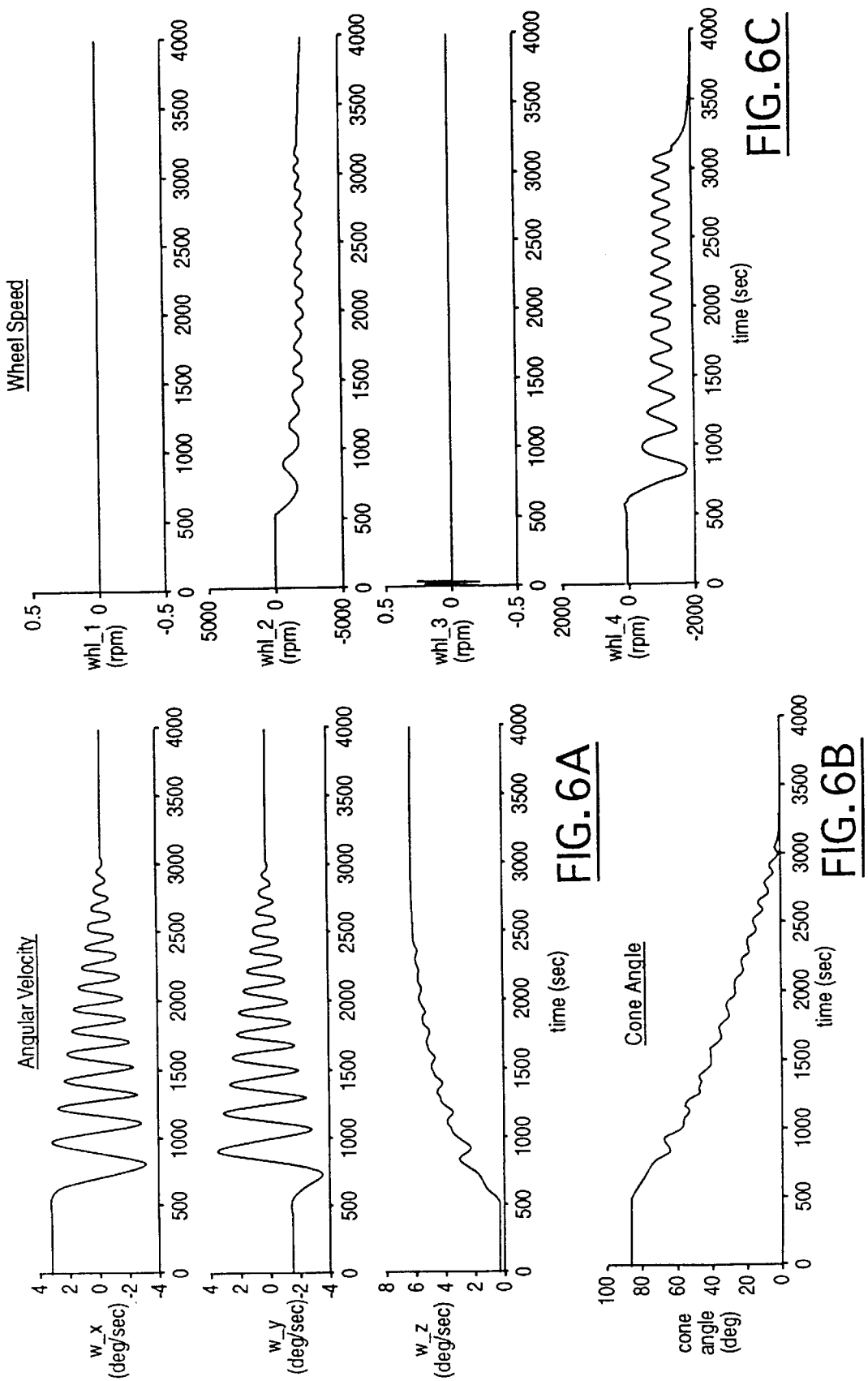

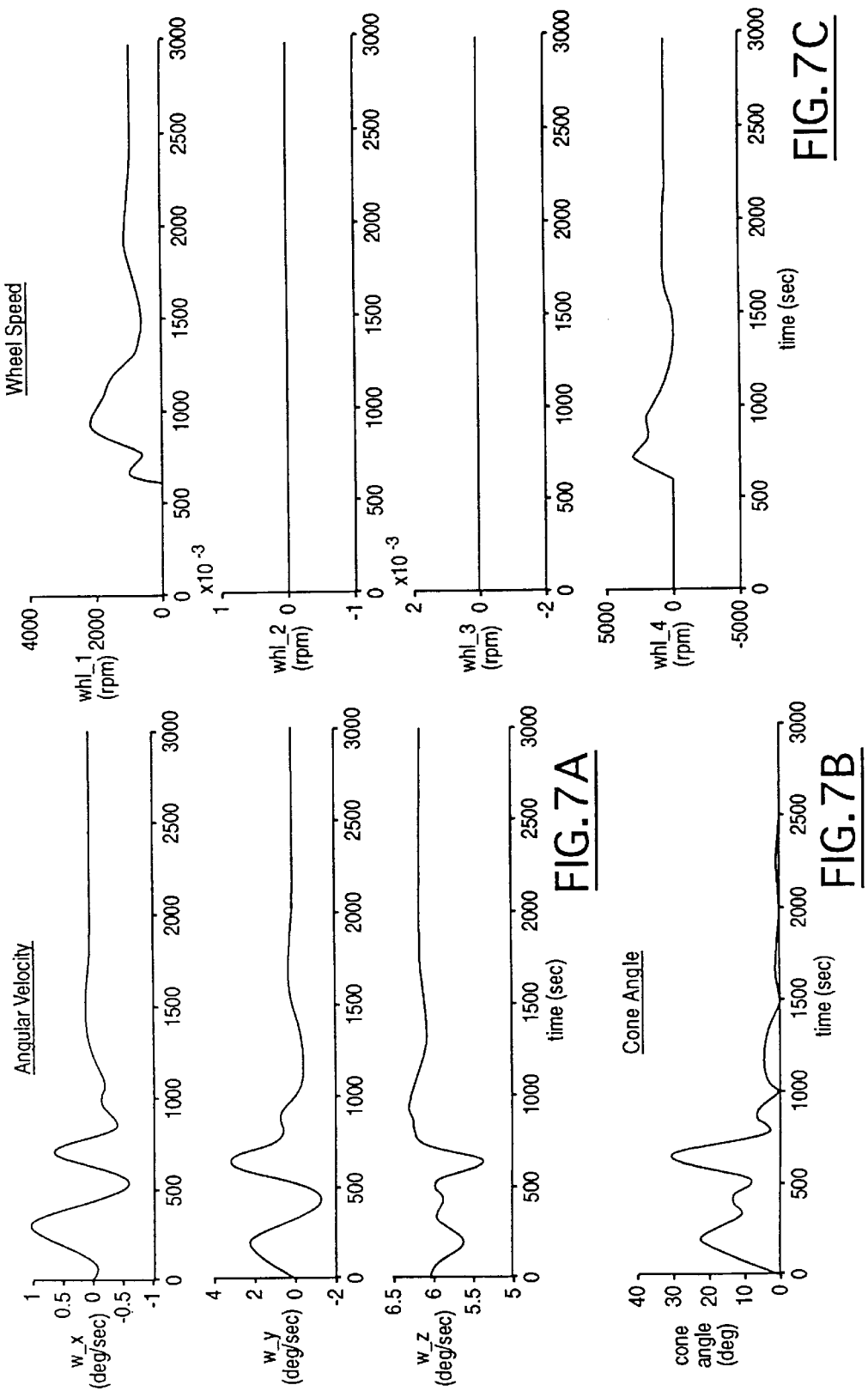

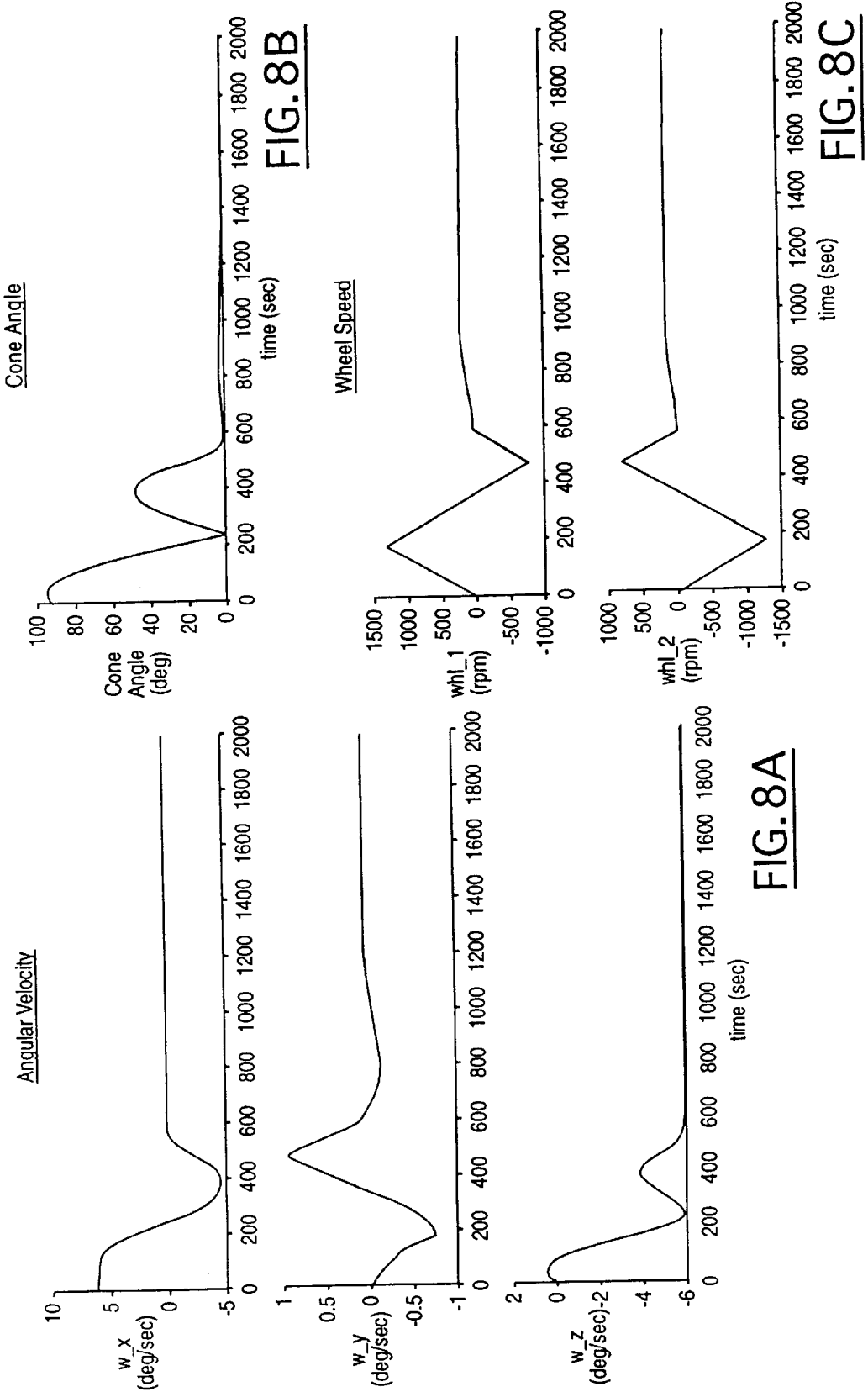

WOBBLE AND NUTATION CONTROL, AND SPIN STABILIZATION FOR A SPACECRAFT USING MOMENTUM CONSERVING DEVICES

TECHNICAL FIELD

The present invention relates to methods and systems for damping nutation and removing wobble of a spinning spacecraft.

BACKGROUND ART

Many types of spacecraft, such as geosynchronous communication satellites, spin about a geometric axis during transfer orbit. One purpose is to take advantage of spin stability of the spacecraft while satisfying thermal and power constraints. A number of disturbance torques, which can be caused by incremental velocity or spin speed change maneuvers, for example can alter the attitude of the spacecraft. More specifically, these disturbances can induce nutation in the spacecraft. Furthermore, a mass redistribution during the transfer orbit spin can induce wobble in the spacecraft.

Known approaches to nutation damping include active nutation damping such as disclosed in U.S. Pat. No. 5,012,992 issued to Salvatore. A problem with these known nutation damping approaches is that they do not account for wobble control.

Wobble control has been done by open loop dynamic balancing which requires an estimate of the mass properties of the spacecraft, in-flight iteration, and adjustment after major maneuvers. Spacecraft typically include a large number of spin to transverse inertia ratios and the geometric wobble angle may change drastically during the transfer orbit. A problem with open loop dynamic balancing is the necessity of iterative ground procedures for controlling the wobble. The success of a mission requires a stabilized spin, effective nutation damping, and wobble control.

Thus, a need has arisen for a method and system which damps nutation while simultaneously automatically rebalancing the spacecraft (i.e., eliminating wobble) after mass property changes thereby eliminating iterative ground procedures.

SUMMARY OF THE INVENTION

Accordingly, it is an object of the present invention to provide a method and system for simultaneously damping nutation and removing wobble of a spacecraft.

It is another object of the present invention to provide a method and system for simultaneously damping nutation and removing wobble of a spacecraft by an input-output decoupling approach such that each component of the output is controlled by one component of the input.

It is a further object of the present invention to provide a method and system for simultaneously damping nutation and removing wobble of a spacecraft by driving a momentum source with a torque proportional to the transverse angular rate and acceleration of the spacecraft.

It is still another object of the present invention to provide a method and system for simultaneously damping nutation and removing wobble of a spacecraft in which the momentum source is driven with a torque depending on the moments of inertia about the spacecraft, the nominal spin speed of the spacecraft, a damping ratio design parameter, and a natural frequency of transverse rate response design parameter.

It is still a further object of the present invention to provide a method and system for simultaneously damping nutation and removing wobble of a spacecraft in which the steady-state transverse angular rates are zero and the steady-state momentum from the momentum source is equal to the value required to balance the torque induced by products of inertia of the spacecraft.

It is yet still another object of the present invention to provide a method and system for simultaneously damping nutation and removing wobble of a spacecraft based on proportional plus derivative feedback of the transverse angular rate of the spacecraft.

In carrying out the above objects, the present invention provides a method of damping nutation and removing wobble of a spacecraft spinning about a given axis. The spacecraft includes first and second momentum sources having linearly independent spin axes in the plane transverse to the given axis.

Angular velocities of the spacecraft along orthogonal first and second axes in the transverse plane are sensed. First and second angular velocity signals representative of the angular velocities along the respective first and second axes are then generated. The angular velocity signals are then processed to form first and second control signals representative of first and second desired torques for driving the first and second momentum sources, respectively. The desired torques have a first additive component proportional to the angular velocities for removing the wobble and a second additive component proportional to the first derivatives of the angular velocities for damping the nutation. The first and second momentum sources are then driven in dependence upon the respective first and second control signals.

Further, in carrying out the above objects, the present invention provides a system for damping nutation and removing wobble of a spacecraft spinning about a given axis. The system includes first and second momentum sources, first and second angular velocity sensors, and a processor which performs the steps in the above-described method.

The advantages accruing to the present invention are numerous. Simultaneous nutation damping (stabilization) and closed-loop dynamic balancing is achieved using velocity sensor measurements and any two or more arbitrarily arranged momentum sources which can provide two dimensional torques in the plane transverse to the spin axis of the spacecraft.

Even if these momentum sources have substantial components of momentum and torque perpendicular to the transverse plane this method is still effective. (Refer to FIG. 3 in which the momentum sources have substantial components of momentum and torque perpendicular to the transverse xy plane.) The present invention provides nutation damping (stabilization) for all spin to transverse inertia ratios. Further, removal of the wobble angle is done in closed-loop, regardless of mass property shift and spin speed variation.

These and other features, aspects, and embodiments of the present invention will become better understood with regard to the following description, appended claims, and accompanying drawings.

BRIEF DESCRIPTION OF THE DRAWINGS

FIGS. 5–8 are graphs of various simulation results; and

BEST MODES FOR CARRYING OUT THE INVENTION

Figure 1:
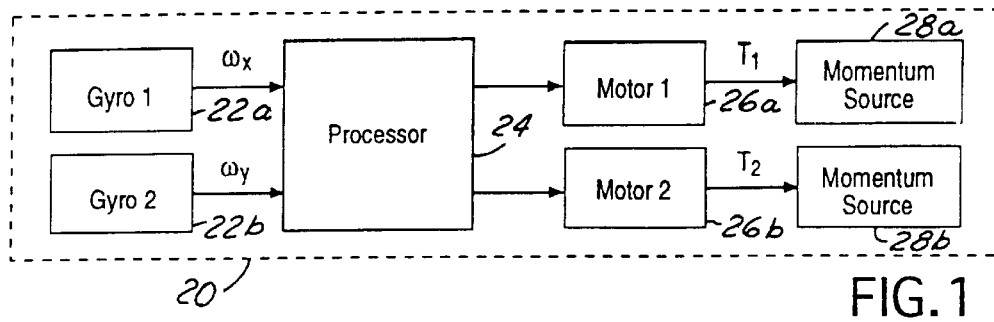
FIG. 1 is a block diagram of an embodiment of a system for simultaneously damping nutation and removing wobble of a spacecraft.

Referring now to FIG. 1, an embodiment for simultaneously damping nutation and removing wobble of a spacecraft 20 is illustrated. Spacecraft 20 is assumed to be a substantially symmetrical body which nominally spins about the Z axis. Spacecraft 20 includes a pair of angular velocity sensors, such as gyros 22 (a–b). Gyros 22 (a–b) sense the angular velocities of spacecraft 20 along orthogonal axes in the transverse plane (the XY plane). Gyros 22 (a–b) produce respective sensor signals $\omega_x$ and $\omega_y$ representative of the respective angular velocities.

The sensor signals $\omega_x$ and $\omega_y$ are applied to a control processor 24 which forms first and second control signals. The first and second control signals are applied to respective motors 26 (a–b). Motors 26 (a–b) drive respective momentum sources 28 (a–b) with first and second desired torques $T_1$ and $T_2$ represented by the control signals.

Momentum sources 28 (a–b) may include a momentum wheel or a reaction wheel. Momentum sources 28 (a–b) have linearly independent spin axes in the transverse plane, or linearly independent momentum components in the transverse plane (i.e., the projection of their spin axes in the transverse plane are linearly independent). The desired torques are determined such that driving momentum sources 28 (a–b) with the desired torques simultaneously damps the nutation and eliminates the wobble of spacecraft 20.

Figure 2:
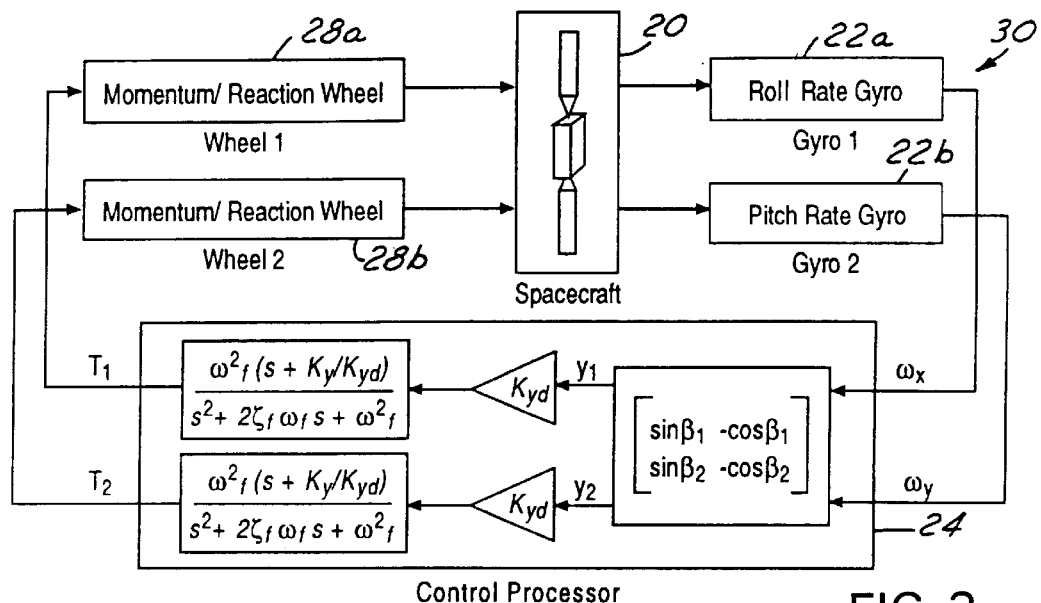
FIG. 2 is a schematic block diagram illustrating in further detail the embodiment shown in FIG. 1.

Referring now to FIG. 2, a schematic block diagram of a Wheel/Gyro Wobble and Nutation Control (W/GWANC) system 30 according to the present invention is shown. W/GWANC system 30 includes spacecraft 20, gyros 22 (a–b), control processor 24, and momentum sources 28 (a–b) (motors 26 (a–b) are not shown).

Figure 3:
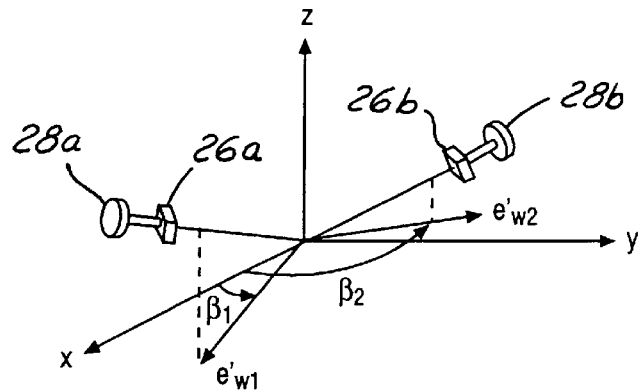
FIG. 3 is an illustration of the arrangement of the momentum sources.

The arrangement of momentum sources 28 (a–b) are shown in FIG. 3. Momentum sources 28 (a–b) may be arbitrarily arranged along their spin axes having momentum components in the transverse (XY) plane, or have momentum components ($e'_{w1}$, $e'_{w2}$) in the transverse plane such that $|\beta_1-\beta_2| \neq 0, \pi$.

As will be described in detail, control processor 24 processes the sensor signals $\omega_x$ and $\omega_y$ to drive momentum sources 28 (a–b) with first and second desired torques $T_1$ and $T_2$. Driving momentum sources 28 (a–b) with the desired torques $T_1$, and $T_2$ damps nutation and removes wobble of spacecraft 20. The desired torques $T_1$, and $T_2$ have first and second additive components. The first additive component is proportional to the sensed angular velocities for removing the wobble. The second additive component is proportional to the first derivatives of the angular velocities (angular rates) for damping the nutation. Control processor 24 processes the sensor signals $\omega_x$ and $\omega_y$ to determine the angular rates.

Dynamic Equations

Consider an ideal system in which a spacecraft spins about the Z axis with two momentum sources such as reaction wheels aligned along the X and Y axes, respectively. The Euler equations for a spacecraft spinning about the Z axis without external torques is:

$$I\dot{\omega}+\dot{h}+\omega \times (I\omega+h)= \quad (1)$$

where:

$\omega=[\omega_x,\omega_y,\omega_z]^T$ are the central body angular rates in body coordinates, h is the composite momentum of wheels, and $$I = \begin{bmatrix} I_{11} & I_{12} & I_{13} \\ I_{12} & I_{22} & I_{23} \\ I_{13} & I_{23} & I_{33} \end{bmatrix}$$

is the composite inertia matrix of the spacecraft about the center of mass.

The following relations can be derived from Equation (1):

$$\dot{\omega}=-I^{-1}(\dot{h}+\omega \times (I\omega+h))=-I^{-1}\dot{h}x+f(\omega,h). \quad (2)$$

Let:

$$\omega=\omega_0+\Delta\omega, \quad h=h_0+\Delta\bar{h}. \quad (3)$$

Linearizing Equation (2) around $\omega_0$, $h_0$ gives:

$$\Delta\dot{\omega} = -I^{-1}\Delta\dot{\bar{h}} + \frac{\partial}{\partial \omega}f(\omega_0, h_0)\Delta\omega + \quad (4)$$

$$\frac{\partial}{\partial h}f(\omega_0, h_0)\Delta\bar{h} + f(\omega_0, h_0).$$

Assume that the wheel torques $\Delta\dot{h}_1$ and $\Delta\dot{h}_2$ are along unit vectors $e_{w1}$ and $e_{w2}$ with torque levels $T_{1\,g}$ and $T_2$, respectively. Denote:

$$\Delta h = \begin{bmatrix} \Delta h_1 \\ \Delta h_2 \end{bmatrix}, \quad e_w = [e_{w1} \; e_{w2}], \quad u = \begin{bmatrix} T_1 \\ T_2 \end{bmatrix} = \begin{bmatrix} u_1 \\ u_2 \end{bmatrix}.$$

Substituting $$\Delta\bar{h}=e_w\Delta h, \quad \Delta\dot{\bar{h}}=e_w u$$

into Equations (3) and (4) yields the linearized equation:

$$\begin{bmatrix} \Delta\dot{\omega} \\ \Delta\dot{h} \end{bmatrix} = \begin{bmatrix} -I^{-1}[\omega_0^x I - (I\omega_0 + h_0)^x] & -I^{-1}\omega_0^x e_w \\ 0_{2\times 3} & 0_{2\times 2} \end{bmatrix} \begin{bmatrix} \Delta\omega \\ \Delta h \end{bmatrix} + \quad (5)$$

$$\begin{bmatrix} -I^{-1}e_w \\ I_{2\times 2} \end{bmatrix} u + \begin{bmatrix} f(\omega_0, h_0) \\ 0_{2\times 1} \end{bmatrix},$$

where $v^x$ is a skew matrix defined as:

$$v^x = \begin{bmatrix} 0 & -v_3 & v_2 \\ v_3 & 0 & -v_1 \\ -v_2 & v_1 & 0 \end{bmatrix},$$

$0_{nxm}$ and $I_{nxm}$ denote zero and identity matrices of dimension nxm, respectively. With $$\omega_0 = \begin{bmatrix} 0 \\ 0 \\ \omega_s \end{bmatrix}, \quad h_0 = \begin{bmatrix} 0 \\ 0 \\ 0 \end{bmatrix},$$

and by assuming that $I_{13}, I_{23} \ll I_{ii}$, (i=1,2,3):

$$f(\omega_0, h_0) = \Gamma^{-1} \begin{bmatrix} I_{23}\omega_s^2 \\ -I_{13}\omega_s^2 \\ 0 \end{bmatrix} \approx \begin{bmatrix} \dfrac{I_{23}}{I_{11}}\omega_s^2 \\ -\dfrac{I_{13}}{I_{11}}\omega_s^2 \\ 0 \end{bmatrix}.$$

Denote:

$$d_1 = \dfrac{I_{23}}{I_{11}}\omega_s^2, \quad d_2 = -\dfrac{I_{13}}{I_{22}}\omega_s^2, \quad d = \begin{bmatrix} d_1 \\ d_2 \\ 0 \\ 0 \end{bmatrix}. \tag{6}$$

Equation (6) represents an imbalance torque in the body frame when products of inertia $I_{13}$ and $I_{23}$ are present.

Now consider a simple case where $I=\mathrm{diag}(I_{11},I_{22},I_{33})$. Without loss of generality, assume that $e_{w1}=[1,0,0]^T$, $e_{w2}=[0,1,0]^T$. It will be shown later that the design formation can be extended to the case where $e_{w1}$ and $e_{w2}$ are arbitrarily arranged (with linear independence) in the transverse (XY) plane. Define the state and control variables as:

$$x = \begin{bmatrix} \omega_x \\ \omega_y \\ h_x \\ h_y \end{bmatrix}, \quad u = \begin{bmatrix} \dot{h}_x \\ \dot{h}_y \end{bmatrix} = \begin{bmatrix} u_1 \\ u_2 \end{bmatrix}. \tag{7}$$

The linearized dynamic equation can be written as:

$$\dot{x} = Ax + Bu, \tag{8}$$

where $$A = \begin{bmatrix} 0 & \rho_x & 0 & \dfrac{\omega_s}{I_{11}} \\ -\rho_y & 0 & -\dfrac{\omega_s}{I_{22}} & 0 \\ 0 & 0 & 0 & 0 \\ 0 & 0 & 0 & 0 \end{bmatrix}, \tag{9}$$

$$B = \begin{bmatrix} -\dfrac{1}{I_{11}} & 0 \\ 0 & -\dfrac{1}{I_{22}} \\ 1 & 0 \\ 0 & 1 \end{bmatrix} = [B_1 \; B_2],$$

and $$\rho_x = \dfrac{I_{22} - I_{33}}{I_{11}}\omega_s, \quad \rho_y = \dfrac{I_{11} - I_{33}}{I_{22}}\omega_s. \tag{10}$$

Control Law Derivation

The present invention is based on the theory of input-output decoupling based control system design. Let u and y be input and output of a system, respectively The input-output decoupling based design takes the following steps. First, take consecutive derivatives of each component $y_i$ of y until at least one component of u appears. The order of derivative $\rho_i$ at which u first appears is called the relative degree of $y_i$. The control law is then synthesized by controlling each $y_i$ as a system of order $\rho_i$.

The sum of $\rho_i$, $\rho=\Sigma\rho_i$, is called the total relative degree of y. An input-output decoupling based control law allows arbitrarily assignment of $\rho$ eigenvalues of the closed-loop system. The remaining n-$\rho$ closed-loop eigenvalues coincide with the transmission zeros of the open-loop system.

In the present invention, $y=[y_1 y_2]^T$, where:

$y_1$ and $y_2$ are transverse angular velocities of the spacecraft orthogonal to $e_{w1}$ and $e_{w2}$, respectively.

Accordingly:

$$y_1 = \omega_y = C_1 x \tag{11}$$

$$y_2 = \omega_x = C_2 x, \tag{12}$$

where:

$$C_1 = [0\,1\,0\,0], \; C_2 = [1\,0\,0\,0]. \tag{13}$$

By taking the derivative of $y_1$ with respect to t, we obtain:

$$\dot{y}_1 = C_1 A x + C_1 B u = C_1 A x - \dfrac{1}{I_{22}} u_2. \tag{14}$$

Equation (14) shows that $y_1$ is of relative degree one and dependent of $u_2$. Because the roll momentum source (aligned along the X axis) is more effective in controlling the pitch (along the Y axis) angular velocity through the cross product $\omega \times h$, consider the second term on the right hand side of Equation (14) to be small. That is, assume:

$$\dot{y}_1 = C_1 A x. \tag{15}$$

The second derivative of $y_1$ is:

$$\ddot{y}_1 = C_1 A^2 x + C_1 A B u = C_1 A^2 x + C_1 A B_1 u_1. \tag{16}$$

Following the same argument:

$$\ddot{y}_2 = C_2 A^2 x + C_2 A B u = C_2 A^2 x + C_2 A B_2 u_2, \tag{17}$$

where $C_1 A B_1 \neq 0$, $C_2 A B_2 \neq 0$.

Expanding Equations (16) and (17) leads to:

$$\ddot{y}_1 = -\rho_x \rho_y y_1 + C_1 A B_1 u_1 - \rho_y \dfrac{\omega_s}{I_{11}} h_y \tag{18}$$

$$\ddot{y}_2 = -\rho_x \rho_y y_2 + C_2 A B_2 u_2 - \rho_x \dfrac{\omega_s}{I_{22}} h_x. \tag{19}$$

Letting:

$$v_1 = -\rho_x \rho_y y_1 + C_1 A B_1 u_1 \tag{20}$$

$$v_2 = -\rho_x \rho_y y_2 + C_2 A B_2 u_2 \tag{21}$$

results in:

$$\ddot{y}_1 = v_1 - \rho_y \dfrac{\omega_s}{I_{11}} h_y, \quad \ddot{y}_2 = v_2 - \rho_x \dfrac{\omega_s}{I_{22}} h_x. \tag{22}$$

The control equations are solved by:

$$u_1 = (C_1 A B_1)^{-1} (v_1 + \rho_x \rho_y y_1) \tag{23}$$

$$u_2 = (C_2 A B_2)^{-1} (v_2 + \rho_x \rho_y y_2) \tag{24}$$

Choose:

$$v_1 = -2\zeta_1 \omega_{1n} \dot{y}_1 - \omega_{1n}^2 y_1 \tag{25}$$

$$v_2 = -2\zeta_2\omega_{2n}\dot{y}_2 - \omega_{2n}^2 y_2 \tag{26}$$

where:

$\zeta_1$ and $\zeta_2$ are design parameters which determine the damping ratios, and $\omega_{1n}$ and $\omega_{2n}$ are design parameters which determine the natural frequencies of the output response.

The closed-loop system is then of the form:

$$\ddot{y}_1 + 2\zeta_1\omega_{1n}\dot{y}_1 + \omega_{1n}^2 y_1 = -\rho_y \frac{\omega_s}{I_{11}} h_y \tag{27}$$

$$\ddot{y}_2 + 2\zeta_2\omega_{2n}\dot{y}_2 + \omega_{2n}^2 y_2 = -\rho_x \frac{\omega_s}{I_{22}} h_x. \tag{28}$$

Let:

$$\zeta_1 = \zeta_2 = \omega, \ \omega_{1n} = \omega_{2n} = \rho_n. \tag{29}$$

to reduce the number of design parameters to two.

By substituting Equations (25), (26), and (29) into Equations (23) and (24), and replacing $y_1$ and $Y_2$ by $\omega_y$ and $\omega_x$, respectively, the following control equations are obtained:

$$u_1 = -(C_1 AB_1)^{-1}(2\zeta\omega_n\dot{\omega}_y + (\omega_n^2 - \rho_x\rho_y)\omega_y) \tag{30}$$

$$u_2 = -(C_2 AB_2)^{-1}(2\zeta\omega_n\dot{\omega}_x + (\omega_n^2 - \rho_x\rho_y)\omega_x), \tag{30}$$

where:

$$-C_1 AB_1 = C_2 AB_2 = \frac{I_{33}}{I_{11}I_{22}}\omega_s \tag{32}$$

$$\rho_x\rho_y = \frac{(I_{11} - I_{33})(I_{22} - I_{33})}{I_{11}I_{22}}\omega_s^2. \tag{33}$$

Control equations (30) and (31) can be written as:

$$u_1 = -K_{yd}\dot{\omega}_y - K_y\omega_y \tag{34}$$

$$u_2 = -K_{yd}\dot{\omega}_x + K_y\omega_x, \tag{35}$$

where:

$$K_y = -(C_2 AB_2)^{-1} 2\zeta\omega_n, \ K_y = -(C_2 AB_2)^{-1}(\omega_n^2 - \rho_x\rho_y). \tag{36}$$

Replacing variables leads to:

$$K_{yd} = -\frac{I_{11}I_{22}}{I_{33}\omega_s} 2\zeta\omega_n, \quad K_y = -\frac{I_{11}I_{22}}{I_{33}\omega_s}(\omega_n^2 - \rho_x\rho_y)$$

The term $K_{yd}$ is the derivative feedback gain term. The term $K_{yd}$ is the proportional feedback gain term. As mentioned earlier, the terms $\omega_x$ and $\omega_y$ are the transverse angular velocities and the terms $\dot\omega_x$ and $\dot\omega_y$ are the transverse angular accelerations. The angular accelerations are determined by taking the derivative of the angular velocities.

Equation (36) shows that when $\rho_x\rho_y > 0$ (non-intermediate axis spin), the selection of $0 < \omega_n^2 < \rho_x\rho_y$ causes a positive feedback of the transverse angular velocity. Positive feedback of the transverse angular velocity is a destabilizing factor for the control system. Therefore, in determining the design parameters, the following constraint is imposed:

$$\omega_n^2 > \max(0, \rho_x\rho_y). \tag{37}$$

Stability Analysis

The control law shown in Equations (34) to (36) is derived under the assumption that the inertia matrix is diagonal. Now it will be shown that this control law not only damps the nutation (stabilizes the spin), but also balances the system (removes wobble). That is, in steady state, the transverse angular velocities are zero.

If the spacecraft's products of inertia are not equal to zero, Equation (8) may be modified to:

$$\dot{x} = Ax + Bu + d + \Delta. \tag{38}$$

where:

A and B are defined in Equation (9), d is defined in Equation (6), and $\Delta$ combines terms of perturbations of Ax and Bu caused by the products of inertia.

Assuming that $I_{12}, I_{13}, I_{23} << I_{ii}$, (i=1,2,3), then $|\Delta| << |x|$. Therefore, the term $\Delta$ in the following analysis may be ignored. With products of inertia, Equations (16) and (17) become:

$$\ddot{y}_1 = C_1 A(Ax + Bu + d) \tag{39}$$

$$\ddot{y}_2 = C_2 A(Ax + Bu + d) \tag{40}$$

Expanding Equations (39) and (40) yields:

$$\ddot{y}_1 = -\rho_x\rho_y y_1 + C_1 AB_1 u_1 - \rho_y \frac{\omega_s}{I_{11}} h_y - \rho_y \frac{I_{23}}{I_{11}}\omega_s^2 \tag{41}$$

$$\ddot{y}_2 = -\rho_x\rho_y y_2 + C_2 AB_2 u_2 - \rho_x \frac{\omega_s}{I_{22}} h_x - \rho_x \frac{I_{13}}{I_{22}}\omega_s^2. \tag{42}$$

By using the control law defined by Equations (34) to (36), the closed-loop system becomes:

$$\ddot{y}_1 + 2\zeta\omega_n\dot{y}_1 + \omega_n^2 y_1 = -\rho_y \frac{\omega_s}{I_{11}} h_y - \rho_y \frac{I_{23}}{I_{11}}\omega_s^2 \tag{43}$$

$$\ddot{y}_2 + 2\zeta\omega_n\dot{y}_2 + \omega_n^2 y_2 = -\rho_x \frac{\omega_s}{I_{22}} h_x - \rho_x \frac{I_{13}}{I_{22}}\omega_s^2. \tag{44}$$

Because each component of the output has a relative degree 2, the totally relative degree of the system is 4 which is equal to the order of the system. This implies that as long as the system is input-output stable, it is also internally stable because transmission zeros are non-existent. In steady-state, both output components are zero, which sets, according to Equations (43) and (44):

$$-\rho_x \frac{\omega_s}{I_{22}} h_x - \rho_x \frac{I_{13}}{I_{22}}\omega_s^2 = 0, \quad -\rho_y \frac{\omega_s}{I_{11}} h_y - \rho_y \frac{I_{23}}{I_{11}}\omega_s^2 = 0. \tag{45}$$

The steady-state wheel momentum is:

$$h_x = -I_{13}\omega_s, \ h_y = -I_{23}\omega_s. \tag{46}$$

The values $h_x$ and $h_y$ are the wheel momentum changes required for the dynamic balancing of the spacecraft in order to remove the wobble. Equation (46) shows that control law (34) to (36) has the ability to self balance the spacecraft. This property is attractive because dynamic balancing is done with closed-loop feedback and the balance is maintained even if the mass properties shift. Thus, iterative ground procedures are avoided. Prior art approaches require open loop balancing to null the steady-state transverse angular velocities.

Operationally, the system proposed by the present invention is easy to monitor because the momentum source speeds settle to constants and the body rates are held at zero. Any significant changes in the momentum source speeds or body rates indicates anomalous behavior. Furthermore, the behavior of the momentum sources and body in steady-state are predictable and reconcilable with mass property estimates. Conversely, differences between predicted and actual wheel speeds may be used to correct mass properties estimates according to Equation (46).

If any body-fixed constant disturbance torque is applied to the spacecraft, a constant term is added to d of Equation (38). The above stability analysis results still hold. Therefore, nutation and wobble are actively controlled even in the presence of body-fixed constant disturbance torque (e.g. Liquid Apogee Motor (LAM) cg offset). Combining with an external momentum source, the closed-loop wobble and nutation control capability can also be used for spin speed change without introducing imbalance. The amount of change in the spin speed depends only on the total momentum change of the system by the external momentum source. It is independent of, for example, of which thruster is fired.

Wheel/Gyro Wobble and Nutation Control (W/GWANC) Algorithm

Now relax the constraint on the direction of the momentum sources' spin axes. Assume still that the Z-axis is the spin axis, and the XY-plane is the transverse plane. Denote the angle between the spin axis of momentum source 28a and the spacecraft's body positive X-axis as $\beta_1$, and the angle between the spin axis of momentum source 28b and the spacecraft's body positive X-axis as $\beta_2$. Then, the A and B matrices in Equation (8) are, respectively:

$$A(\beta) = \begin{bmatrix} 0 & \rho_x & \frac{\omega_s}{I_{11}}\sin\beta_1 & \frac{\omega_s}{I_{11}}\sin\beta_2 \\ -\rho_y & 0 & -\frac{\omega_s}{I_{22}}\cos\beta_1 & -\frac{\omega_s}{I_{22}}\cos\beta_2 \\ 0 & 0 & 0 & 0 \\ 0 & 0 & 0 & 0 \end{bmatrix}, \quad (47)$$

$$B(\beta) = \begin{bmatrix} -\frac{1}{I_{11}}\cos\beta_1 & -\frac{1}{I_{11}}\cos\beta_2 \\ -\frac{1}{I_{22}}\sin\beta_1 & -\frac{1}{I_{22}}\sin\beta_2 \\ 1 & 0 \\ 0 & 1 \end{bmatrix} = [\,B_1(\beta_1)\ \ B_2(\beta_2)\,]$$

Choose $y_i$, (i=1,2) to be:

$$y_1 = \frac{I_{11}}{\sqrt{I_{11}I_{22}}}\sin\beta_i\omega_x - \frac{I_{22}}{\sqrt{I_{11}I_{22}}}\cos\beta_i\omega_y, \quad (48)$$

then the corresponding output matrix becomes:

$$C_i(\beta_i) = \left[\frac{I_{11}}{\sqrt{I_{11}I_{22}}}\sin\beta_i\ -\frac{I_{22}}{\sqrt{I_{11}I_{22}}}\cos\beta_i\ \ 0\ \ 0\right]. \quad (49)$$

Following the same derivation as before, the input-output decoupling based control law, given the design parameters $w\omega$, and f is obtained. That is:

$$u_i = -(C_i(\beta_i)A(\beta)B_i(\beta_i))^{-1}(2\zeta\omega_n\dot{y}_i+\omega_n^2 y_i+C_i(\beta_i)A(\beta)^2 x). \quad (50)$$

Control equation (50) can be simplified by assuming that $I_{11}\approx I_{22}$. Simple manipulation then gives:

$$y_i \approx \sin\beta_i\omega_x - \cos\beta_i\omega_y \quad (51)$$

$$C_i(\beta_i)A(\beta)B_i(\beta_i) \approx \frac{I_{33}}{I_{11}I_{22}}\omega_s \quad (52)$$

$$C_i(\beta_i)A(\beta)^2 x \approx -\rho_x\rho_y y_i. \quad (53)$$

Substituting Equations (51) to (53) into Equation (50) results in the W/GWANC algorithm for an arbitrarily arranged pair of wheels whose axes are linearly independent in the transverse plane. The W/GWANC law is given by:

$$u_1 = K_{yd}\dot{y}_1 + K_y y_1 \quad (54)$$

$$u_2 = K_{yd}\dot{y}_2 + K_y y_2 \quad (55)$$

with:

$$y_1 = \sin\beta_1\omega_x - \cos\beta_1\omega_y \quad (56)$$

$$y_2 = \sin\beta_2\omega_x - \cos\beta_2\omega_y \quad (57)$$

$$K_{yd} = -\frac{I_{11}I_{22}}{I_{33}\omega_s}2\zeta\omega_n \quad (58)$$

$$K_y = -\frac{I_{11}I_{22}}{I_{33}\omega_s}(\omega_n^2 - \rho_x\rho_y), \quad (59)$$

where $\zeta$ and $\omega_n$ are design parameters subject to:

$$\omega_n^2 > \max(0,\rho_x\rho_y). \quad (60)$$

In order to implement control equations (54) and (55) the transverse angular velocities and their first derivatives (transverse angular accelerations) are needed. The following approach is used to derive the required information from gyro measurements. Replacing $u_i$ by $T_i$, in the transfer function form (54) and (55) can be written as:

$$T_i = \left(s + \frac{K_y}{K_{yd}}\right)K_{yd}y_i, \quad i=1,2 \quad (61)$$

The term $T_i$ represents the desired torque for driving the momentum sources to simultaneously damp nutation and control wobble. Equation (61) is then combined with a low-pass quadratic filter of the form:

$$\frac{\omega_f^2}{s^2 + 2\zeta_f\omega_f s + \omega_f^2}, \quad (62)$$

where $\zeta_f$ and $\omega_f$ are the damping ratio and bandwidth of the quadratic filter.

Combining (61) and (62) yields:

$$T_i = F(s)K_{yd}y_i, \quad F(s) = \frac{\omega_f^2(s + K_y/K_{yd})}{s^2 + 2\zeta_f\omega_f s + \omega_f^2}. \quad (63)$$

FIG. 2 summarizes the implementation of the W/GWANC algorithm by control processor 24. With an additional non-transverse axis gyro, the W/GWANC algorithm can be used for nutation and wobble control, and spin stabilization about any given axis, $e_s$, in the body frame. One such usage is to spin about LAM axis to reduce the coning loss during LAM firing. In this case, only Equations (56) and (57) are modified to:

$$\begin{bmatrix} y_1 \\ y_2 \end{bmatrix} = \begin{bmatrix} \sin\beta_1 & -\cos\beta_1 \\ \sin\beta_2 & -\cos\beta_2 \end{bmatrix} E_n \begin{bmatrix} \omega_x \\ \omega_y \\ \omega_z \end{bmatrix} \quad (64)$$

where $E_n$ is the left null space of $e_s$. It is assumed that $e_s$ is closer to z axis. All the results demonstrated are applicable to any other axis.

The present invention requires two momentum sources which have linearly independent spin axes in the transverse plane, or the projection of their spin axes in the transverse plane are linearly independent. Thus, in the case that more than two momentum sources are available, control processor 24 calculates the two dimensional wheel torque command along transverse axes and distributes it to all available wheels. The present invention may be employed on spacecraft having more than two momentum sources, for instance, a spacecraft having four momentum sources as shown in FIG. 4.

Figure 4:
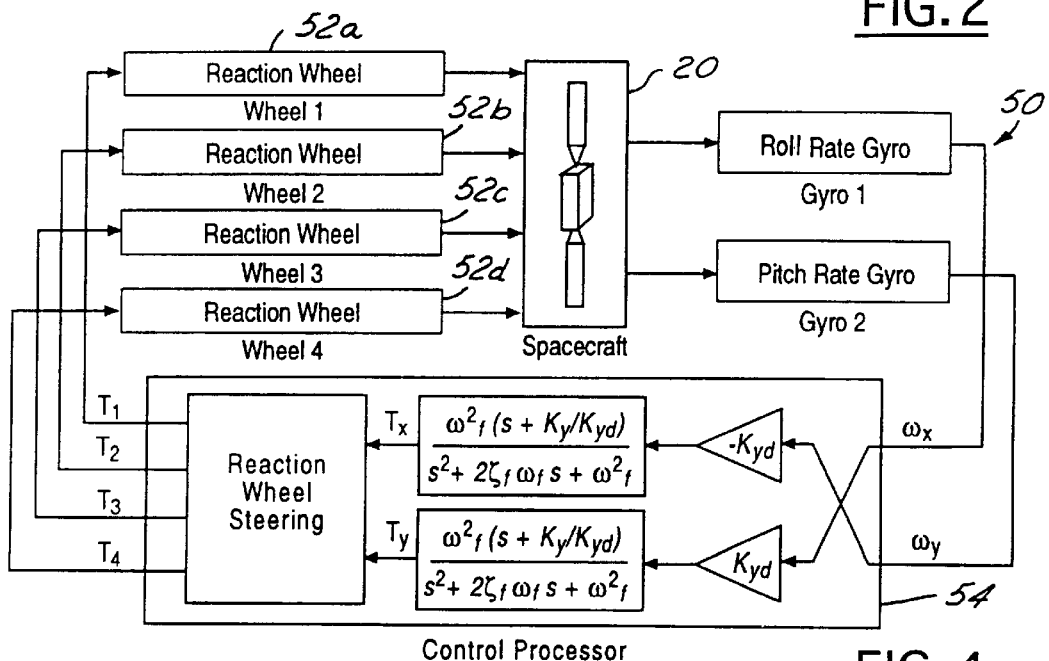
FIG. 4 is a schematic block diagram illustrating another embodiment of the present invention.

FIG. 4 represents a schematic block diagram of a W/GWANC system 50 according to the present invention. W/GWANC system 50 includes four reaction (or momentum) wheels 52(a–d) and a control processor 54. Control, processor 54 calculates the two dimensional wheel torque command along transverse axes and distributes it to wheels 52(a–d).

Testing Results

The invention has been tested through simulations for a class of spacecraft mass properties and wheel configurations. The mass properties include all spin to transverse inertia ratios from maximum axis spin, through intermediate axis to minimum axis spin. The wheel configurations include the reaction wheel assembly where the two wheels used for control are either in the transverse plane or have components in the transverse plane.

Test 1:

Maximum Axis Spin.

The mass properties of a spacecraft at 100% fraction fill is used in the test. The reaction wheels are configured such that two of four wheels are in the x-y plane, and the other two are in the y-z plane. For this case, x is the axis of maximum inertia. The objective is to damp the nutation and automatically balance the spacecraft about the x-axis spin. The principal axis of the spacecraft is about 30° from the x axis. In the simulation, the two wheels in the transverse plane (i.e., y-z plane) are used. The control is on after t=400 sec. Simulation results are depicted in FIGS. 5(A–C).

Test 2:

Minimum Axis Spin, Flat Spin Recovery.

The mass properties are the same as in Test 1.

The objective is to damp nutation and balance the spacecraft about the minimum axis (z-axis) spin. The simulation starts with a flat spin about the principal axis of inertia and about a 90° cone angle. Simulation results are depicted in FIGS. 6(A–C).

Test 3:

Minimum Axis Spin, With Wheel Axes off the Transverse Plane.

The reaction wheels of a spacecraft are configured such that each wheel axis has x, y, and z components. Four wheels or any three wheels can provide desired wheel torques in the transverse plane. But with any two wheels, the torque and momentum envelope lie in a plane which cross the transverse plane with certain angles. FIGS. 7(A–C) show that with two wheels having linear independent spin axes projected in the transverse plane, W/GWANC damps the nutation and balances the spacecraft.

Test 4: Intermediate axis spin, with momentum wheel platforms. In this test, the object is to stabilize and balance the spacecraft about a backward z-axis spin. z is the intermediate moment of inertia axis. The control system is implemented with gimballed momentum wheels. It is assumed that both wheel platforms are aligned along the pitch axis, one canted 10° toward positive X-axis and the other −10°. Simulation results are shown in FIGS. 8(A–C).

It should be noted that the present invention may be used in a wide variety of different constructions encompassing many alternatives, modifications, and variations which are apparent to those with ordinary skill in the art. Accordingly, the present invention is intended to embrace all such alternatives, modifications, and variations as fall within the spirit and scope of the appended claims.

For instance, the present invention may be applied to a spacecraft having only a single momentum source such as a wheel whose axis lies in the transverse plane. Like two wheel control, single wheel control is also stabilizing, thus allowing a smooth transition in case of one wheel failure. Furthermore, the single wheel control allows removal of wobble about one transverse axis. Single wheel control has the advantages of having the ability to incorporate performance constraints into the design formulation (e.g. wobble angle limit) and simplifies procedures for dynamic balancing.

Figure 9:
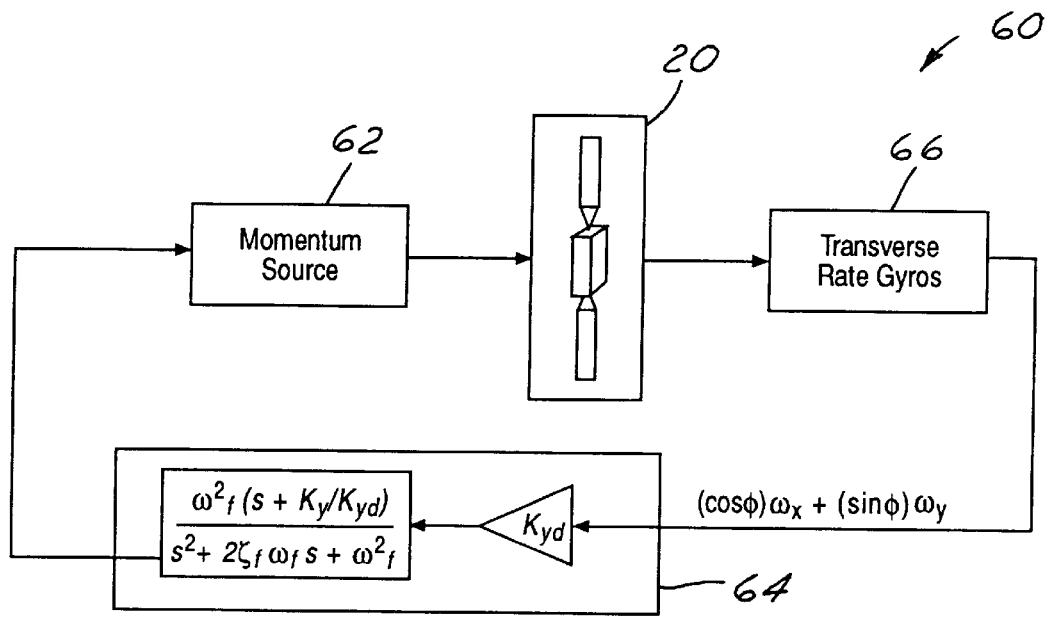
FIG. 9 is a schematic block diagram illustrating another embodiment of the present invention.

FIG. 9 represents a schematic block diagram of a single wheel W/GWANC system 60. Single wheel W/GWANC system includes a solitary momentum source 62 such as a reaction or momentum wheel, a control processor 64, and two transverse rate gyros 66. Momentum source 62 has an axis which lies, at least primarily, in the transverse plane. In FIG. 9, the symbol $\theta$ is a tuning parameter, where $|\theta|<<\pi/2$ because large $\theta$ is destabilizing. The tuning parameter $\theta$ may be adjusted to minimize the wobble between the two transverse axes. For instance, $\theta=0$ nulls $\omega_x$ roll rate and leaves intact $\omega_y$ pitch rate. A non-zero $\theta$ nulls some $\omega_x$ roll rate and some $\omega_y$ pitch rate.

What is claimed is:

1. A method of damping nutation (stabilization) and removing wobble of a spacecraft spinning about a given axis, the spacecraft provided with first and second momentum sources having linearly independent momentum components in the plane transverse to the given axis, the method comprising:

sensing angular velocities of the spacecraft along orthogonal first and second axes in the transverse plane, and generating first and second angular velocity signals representative of the angular velocities along the respective first and second axes;

processing the angular velocity signals to form first and second control signals representative of first and second desired torques for driving the first and second momentum sources, respectively, the desired torques having a first additive component proportional to the angular velocities for removing the wobble and a second additive component proportional to the first derivatives of the angular velocities for damping the nutation; and driving the first and second momentum sources in dependence upon the respective first and second control signals.

2. The method of claim 1 wherein:

the desired torques $T_i$ (i=1,2) is given by:

$T_i = K_{yd}\dot{Y}_i + K_y Y_i$ where $K_{yd}$ is a derivative feedback gain term,
$K_y$ is a proportional feedback gain term,
$Y_i$ is the transverse angular velocity along the orthogonal first and second axes in the transverse plane, and
$\dot{Y}_i$ is the transverse angular acceleration along the orthogonal first and second axes in the transverse plane.

3. A method of damping nutation (stabilization) and controlling wobble of a spacecraft spinning about a given axis, the spacecraft provided with a momentum source having a momentum component in the plane transverse to the given axis, the method comprising:

sensing angular velocities of the spacecraft along orthogonal first and second axes in the transverse plane, and generating first and second angular velocity signals representative of the angular velocities along the respective first and second axes;

processing the angular velocity signals to form a control signal representative of a desired torque for driving the momentum source, the desired torque having a first additive component proportional to the angular velocities for removing the wobble about one axis transverse to the spin axis and a second additive component proportional to the first derivatives of the angular velocities for damping the nutation; and driving the momentum source in dependence upon the control signal.

4. A system for damping nutation (stabilization) and removing wobble of a spacecraft spinning about a given axis, the system comprising:

first and second momentum sources having linearly independent momentum components in the plane transverse to the given axis;

first and second angular velocity sensors which sense angular velocities of the spacecraft along orthogonal first and second axes in the transverse plane, and generate first and second angular velocity signals representative of the angular velocities along the respective first and second axes; and a processor which processes the angular velocity signals to form first and second control signals to drive the first and second momentum sources, respectively, the control signals driving the momentum sources with respective first and second desired torques, the desired torques having a first additive component proportional to the angular velocities for removing the wobble and a second additive component proportional to the first derivative of the angular velocities for damping the nutation.

5. The system of claim 4 wherein:
the desired torque T is given by:

$$T = K_{yd} \dot{Y}_i + K_y K_i (i=1,2)$$

where
$K_{yd}$ is a derivative feedback gain term,
$K_Y$ is a proportional feedback gain term,
$Y_i$ is the transverse angular velocity along orthogonal first and second axes in the transverse plane, and
$\dot{Y}_i$ is the transverse angular accelerations along the orthogonal first and second axes in the transverse plane.

6. The system of claim 4 wherein:
the momentum sources include a momentum wheel driven by a motor.

7. The system of claim 4 wherein:
the momentum sources include a reaction wheel driven by a motor.

8. The system of claim 4 wherein:
the angular velocity sensors include a gyro.

* * * * *